United States Patent [19]

Weingarten

[11] Patent Number: 6,078,579
[45] Date of Patent: *Jun. 20, 2000

[54] TELEPHONIC SYSTEMS FOR COMMUNICATION OVER COMPUTER NETWORKS

[75] Inventor: Walter Jay Weingarten, Brooklyn, N.Y.

[73] Assignee: WJW Technologies Inc., Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/687,180

[22] Filed: Jul. 25, 1996

[51] Int. Cl.$^7$ .............................. H04J 3/26; H04J 3/24; H04L 12/50; H04M 11/00

[52] U.S. Cl. ........................... 370/352; 370/60; 370/349; 370/389; 370/401; 379/90.01; 379/93.01

[58] Field of Search ...................................... 370/352, 353, 370/380, 389, 392, 396, 401, 404, 427, 435, 450, 465, 485, 360, 349, 60, 60.1, 94.1; 379/90.01, 93.01, 93.05, 93.09, 100.15, 100.16

[56] References Cited

U.S. PATENT DOCUMENTS

| | | | |
|---|---|---|---|
| 4,771,425 | 9/1988 | Baran et al. | 370/85 |
| 5,327,486 | 7/1994 | Wolff et al. | 379/96 |
| 5,416,842 | 5/1995 | Aziz | 380/30 |
| 5,526,353 | 6/1996 | Henley et al. | 370/60.1 |
| 5,583,920 | 12/1996 | Wheeler, Jr. | 379/88 |
| 5,604,737 | 2/1997 | Iwami et al. | 370/352 |
| 5,608,786 | 3/1997 | Gordon | 379/100 |
| 5,610,910 | 3/1997 | Focsaneanu et al. | 370/351 |
| 5,726,984 | 3/1998 | Kubler et al. | 370/349 |
| 5,754,547 | 5/1998 | Nakazawa | 370/401 |
| 5,768,513 | 6/1998 | Kuthyar | 395/200.34 |
| 5,805,587 | 9/1998 | Norris et al. | 370/352 |
| 5,812,819 | 9/1998 | Rodwin et al. | 395/500 |

FOREIGN PATENT DOCUMENTS

97/16916  5/1997  WIPO.

OTHER PUBLICATIONS

Screen Print–Out from Aplio/Phone Internet Website, Jan. 12, 1998.

Gina Smith, *Internet Phoning on Display*, Nov. 19, 1997, ABC News Website on Internet.

Amy Cortese, *Long Distance via the Net—Without a PC*, Dec. 11, 1997, Business Week Website.

*ETRE—Part Two*, Nov., 1997, p. 3, Internet.

Gina Smith, *Go, Bill, Go'* and best of show, Nov. 23, 1997, San Francisco Examiner.

*Innovations Abound at Internet World*, Dec. 12, 1997, USA Today Tech Report.

*Innomedia Announces Infotalk Internet Telephony Device*, Oct. 7, 1997, Santa Clara, California.

*Innomedia Announces Infogate—Internet Gateway for Voice and Fax*, Nov. 18, 1997, Los Vegas, Nevada.

*Innomedia Announces Infoview Video System*, Nov. 11, 1997, Santa Clara, California.

*Primary Examiner*—Krista Zele
*Assistant Examiner*—Allan Hoosain
*Attorney, Agent, or Firm*—Abelman, Frayne & Schwab

[57] ABSTRACT

Telephonic systems for communication over computer networks comprise telephonic devices with means for symbol entry and programmable electronic devices allowing the telephonic devices to conduct audio and other forms of communication over computer networks upon entry of appropriate symbols through the means for symbol entry on the telephonic devices.

47 Claims, 5 Drawing Sheets

TELEPHONIC SYSTEMS FOR COMMUNICATION OVER COMPUTER NETWORKS

BACKGROUND OF THE INVENTION

1. Field of the Invention

This invention relates to systems for communicating over computer networks and, more particularly, to systems allowing for telephonic communication over computer networks.

2. Description of the Related Art

Computer networks interconnecting a large number of computers owned by different users are proliferating at an ever accelerating rate. One extremely popular and well known network is the Internet which links many hundreds of thousands of computers owned by almost as many businesses, educational institutions, governmental agencies, and individuals.

There has been much interest of late in using the Internet and other computer networks to conduct long-distance telephone conversations. The advantage of using the computer networks in this fashion involves avoiding using the conventional long-distance telephone network, and incurring telephone company charges.

Such efforts commonly have involved the use of a software package installed on a personal computer (PC) equipped with a sound card, microphone, and speakers enabling the PC to produce audible sounds, such as audible sounds encoded on CD-ROM (compact disk—read-only memory) disks which are placed in CD-ROM disk drives in certain personal computers. The software package allows a first user of a PC to employ the sound card, microphone, and speakers as the equivalent of a telephone, with the sound card, microphone, and speakers either receiving the first user's voice for transmission to a second user with whom the first user is conversing or transmitting the second user's voice to the first user. Some versions of such software allow only half duplex use, or in other words, either conversant may either talk or listen, but not both simultaneously, but more recent versions allow full duplex use equivalent to conventional telephone communications where conversants may talk and listen simultaneously. Such software includes "Internet Phone" produced by VocalTec Inc., of Northvale, N.J., "WebTalk" produced by Quarterdeck Corp. of Santa Monica, Calif., and "WebPhone" produced by NetSpeak Corporation of Boca Raton, Fla.

The audio signal in appropriate digital form travelling over the Internet from a PC will normally enter the Internet just like any other digital data through a local Internet Service Provider (ISP). The appropriate digital form will be in groups of digital information known as packets, each packet containing both the data representing the audio signal and control information telling the Internet what to do with the packet. Since these ISPs exist worldwide as "gateways" to the Internet, persons with PCs connected to the Internet can conduct telephone conversations at no added cost over the access charges paid to their ISP. Because of poor voice quality, delays, and lost connections experienced during Internet conversations, special servers have been or will be installed at many ISPs to handle the increase in Internet traffic due to Internet voice communications.

One callback and Internet access provider, International Discount Telecommunications Corp. (IDT) of Hackensack, N.J., has demonstrated a prototype that purportedly allows a PC anywhere in the world having enough memory, a microphone, speakers, a sound card, and an DT account to be connected to a telephone in the United States.

Despite the rapid advances and improvements in Internet telephony, several disadvantages remain. The participants in any such conversation all require PCs to conduct a conversation, all of the PCs must be connected to the Internet for the conversation to begin, and all of the PCs must have the same Internet telephony software as no software package currently being marketed is compatible with any other package. The IDT prototype requires one PC with peripherals online for a conversation to occur.

In addition, the sound cards and speakers as well as insufficient PC memory cause communication problems. For example, frequent volume adjustment to the speakers is necessary on both ends of the communications link to obtain audible communication and control of background noises.

The present invention eliminates or makes substantial progress in overcoming these disadvantages.

SUMMARY OF THE INVENTION

The present invention comprises a telephonic device which connects directly to the Internet or other computer network without a PC being present between the telephonic device and the computer network.

In a first embodiment of the invention, the telephonic device comprises a custom designed telephone hardwired with a microcontroller. The custom designed telephone is equipped with a separate alphabetic keypad as well as a numeric one. The microcontroller is programmed so as to respond to the dialing of the alphabetic host address, which is analogous to an electronic mail (e-mail) address, or its equivalent, a number known as the Internet Protocol (IP) address, of the telephone of the party called by sending out an appropriate signal to the telephone of the party called over the Internet, thus causing the telephone of the party called to ring. The party called then can pick up the telephone and the telephone conversation can commence. The telephone of the party called is of the same custom design as the telephone of the calling party. Both custom designed telephones are constantly connected to the Internet through the ISP of each party and are, thus, ordinarily unavailable for traditional use.

A second embodiment of the invention differs from the first embodiment in that the microcontroller is not integral with the telephone, but is contained in an electronic box plugged into the phone, but separate from it. This embodiment allows the use of a telephone which only differs from a conventional telephone by the presence of a separate alphabetic keypad. This telephone can be unplugged from the system and used as a conventional telephone, as contrasted to the custom designed telephone included in the first embodiment of the invention.

A third embodiment of the invention involves the use of conventional telephones, Central Exchange (centrex), Private Branch Exchange (pbx), or a PC-based switching system (pcex), and the Internet. In this embodiment, one conversant is able to use a telephone to call a centrex, pbx, or pcex connected to the Internet. The call goes go through the Internet to a second centrex, pbx, or pcex which completes the call through the regular telephone lines.

A fourth embodiment of the invention is similar to the first embodiment of the invention in that a custom designed telephone hardwired with a microcontroller is disclosed. However, the microcontroller is programmed so that the telephone need not always be connected to the Internet to make and receive telephone calls over the Internet and can, thus, be used as an ordinary telephone when calls are not being made over the Internet. The microcontroller is programmed so that when a call over the Internet is initiated by dialing the telephone number of a called telephone, the alphabetic host address or IP address of the calling telephone, and the alphabetic host address or IP address of the called telephone, the calling telephone first calls over the conventional telephone lines, transmitting the alphabetic host address or IP address of the calling telephone to the called telephone and then hangs up. The called telephone, having a microcontroller programmed in a manner compatible with that of the calling telephone, then dials the alphabetic host address or IP address of the calling telephone, while the calling telephone dials the alphabetic host address or IP address of the called telephone, resulting in both of the telephones being connected to the Internet only when a voice conversation between the owners of the telephones occurs.

A fifth embodiment of the invention differs from the fourth embodiment of the invention in that a device or devices capable of sending and/or receiving data other than an audio signal over the Internet is incorporated into the telephone.

It is an object of this invention to conduct voice conversations over computer networks without the use of computers.

It is a further object of this invention to initiate voice conversations over computer networks despite the absence of any initial working connection between the devices used for the voice conversations and the computer networks.

It is a still further object of this invention to standardize voice communication over computer networks so that incompatible equipment does not prevent such communication.

It is yet a further object of this invention to provide devices capable of enabling voice communications and other forms of data communication simultaneously over computer networks.

These and other objects and advantages of the present invention will become more apparent to those of ordinary skill in the art upon consideration of the attached drawings and the following description of the preferred embodiments which are meant by way of illustration and example only, but are not to be construed as in any way limiting the invention disclosed and claimed herein.

DESCRIPTION OF THE PREFERRED EMBODIMENTS

For a more detailed description of the invention in its several embodiments given only by way of example and not to be construed as limiting the invention in any fashion, we refer to the drawings.

Figure 1:
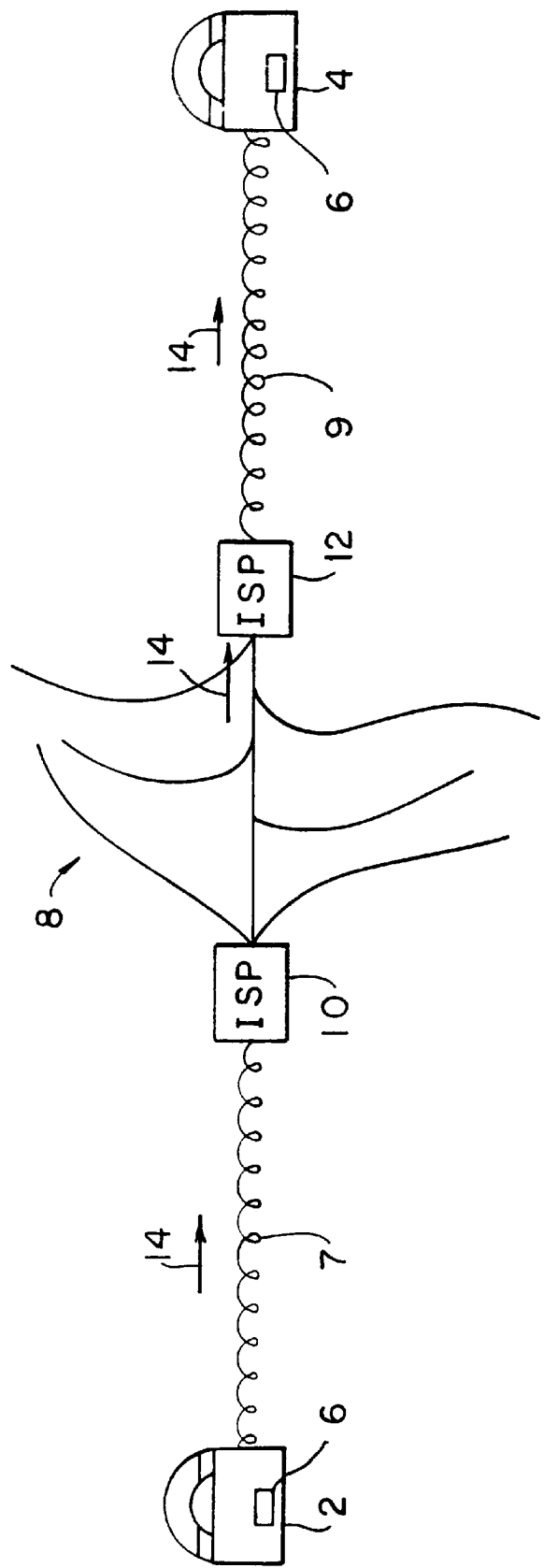
FIG. 1 is a schematic diagram of the first embodiment of the invention.

FIG. 1 represents the first embodiment of the invention. In this embodiment, a first telephone 2 and a second telephone 4 are of the same design, each containing a microcontroller 6 allowing the first telephone 2 and the second telephone 4 to make and receive telephone calls over the Internet 8 or another computer network and a separate alphabetic keypad as well as a numeric one. (It should be understood that a conventional telephone numeric keypad can be used in combination with a separate alphabetic keypad, although the presence of multiple letters over the numbers in such a numeric keypad would be redundant and possibly confusing to the user.) Alternatively, each telephone could have a conventional telephone numeric keypad and extra selection keys such as, for example only, "shift", "ctrl", or "alt", to select between the multiple letters shown over some of the numbers on the conventional telephone numeric keypad. (A conventional telephone numeric keypad could also be used, without any extra selection keys, in a rather inconvenient manner by making use of the keys without letters to select letters.) The first telephone 2 is connected to the Internet 8 through a first conventional telephone line 7 and the ISP 10 of the party owning the first telephone 2 and the second telephone 4 is connected to the Internet 8 through a second conventional telephone line 9 and the ISP 12 of the party owning the second telephone 4.

As an example of the operation of the invention, if the party owning the first telephone 2 wishes to call the party owning the second telephone 4, the party owning the first telephone would preferably dial alphabetic symbols corresponding to the alphabetic host address of the second telephone 4 or the numeric equivalent of the alphabetic host address, a number corresponding to the IP address of the second telephone 4.

The use of an alphabetic host address would be most convenient to connect a call to those Internet users whose IP addresses for their telephones are dynamically allocated every time they are connected to the Internet. The use of an IP address is a viable alternative convenient to connect a call to those Internet users who have permanent IP addresses for their telephones.

A typical alphabetic host address, which is analagous to an e-mail address, might be jones@johnson.com. If this were an e-mail address, the address would signify that jones is a user on a computer named johnson in the Domain Name System (DNS) domain named com. (The Internet is subdivided into administrative units containing groups of participating computers called domains.) Analogously, since we are dealing with a telephone that is the host, instead of a computer, the address signifies that jones is a user on a telephone named johnson in the Internet domain named com.

The IP address, which is the numeric equivalent of the alphabetic host address, is typically expressed in dot notation. For example, 198.95.262.38 is a typical IP address. Of course, the microcontroller 6 could be programmed so that it would respond without the use of the dots or the dots could be replaced by the use of the "*" key on the typical touch tone telephone keypad.

It should be noted that an IP address identifies one network interface on a host. Thus, if a host, in our case, a telephone, has two or more network interfaces (see fifth embodiment of invention below), the host will have a different IP address for each network interface. Each IP address, as presently assigned by the authorities responsible for assigning such addresses on the Internet, is a 32-bit binary number written as 4 fields, 8 bits each, separated by dots. (The typical IP address given above is the decimal equivalent of the binary address.) Due to the sheer number of devices being connected to the Internet, the available addresses are running low. Any extension of the IP addressing system to cover additional addresses, whether IPng (Internet Protocol Next Generartion), also known as IPv6 (Internet Protocol, Version 6), or another subsequent scheme which is numerically based, can be easily accomodated by the invention as disclosed herein.

In any event, the microcontroller 6 of the first telephone 2 is programmed to send out a signal 14 which is relayed by the ISP 10 of the party owning the first telephone 2 and the ISP 12 of the party owning the second telephone 4 to the second telephone 4 causing the second telephone 4 to ring. The owner of the second telephone 4 can then pick up the second telephone 4 and a conversation can begin between the owner of the first telephone 2 and the owner of the second telephone 4.

The signal 14 travels over the Internet 8 using the TCP/IP (Transmission Control Protocol/Internet Protocol) suite of protocols for transmission of data over the Internet. Since the type of communication ordinarily to be effected by the invention disclosed herein is simple voice, text, audiovisual, or visual communication where everything is transmitted in realtime mode and data may be easily resent if corrupted in the transmission, those protocols in the TCP/IP suite which do not perform extensive error checking on packets sent may be used, instead of those more appropriate for data where visual and mathematical accuracy is a critical consideration. Thus, User Datagram Protocol (UDP), which causes data to flow on the Internet without error checking, may be used by the microcontroller 6 of the telephones 2,4 to transmit voice instead of the more conventional TCP which provides for such error checking. This will allow for more efficient transmission of voice by the disclosed invention than would be possible if conventional PCs using TCP to transmit voice were used.

The embodiment of the invention depicted by FIG. 1, however, requires that the first telephone 2 and the second telephone 4 be "dedicated" telephones constantly connected to the Internet 8 and therefore unavailable for use with the conventional telephone network unless they are connected to the telephone network over Integrated Services Digital Network (ISDN) lines which would possibly allow each telephone to be used for calling over the conventional telephone lines even though they are also connected to the Internet.

Figure 2:
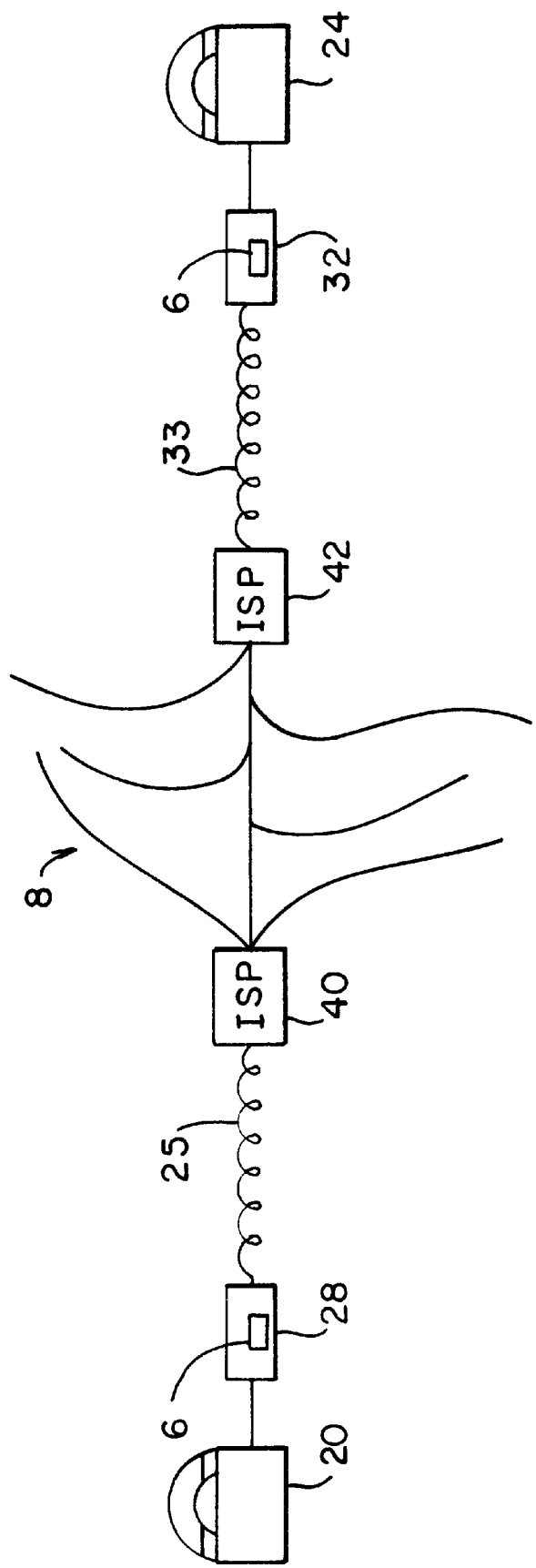
FIG. 2 is a schematic diagram of the second embodiment of the invention.

A second embodiment of the invention is shown in FIG. 2. A first telephone 20 and a second telephone 24 are connected to the Internet 8. The first telephone 20 has an electronic box 28 connected to it, the electronic box 28 containing a microcontroller 6. The second telephone 24 has an electronic box 32 connected to it, the electronic box containing a microcontroller 6.

Similarly to FIG. 1, the first telephone 20 is connected to the Internet 8 through a first conventional telephone line 25 and the ISP 40 of the party owning the first telephone 20 and the second telephone 24 is connected to the Internet 8 through a second conventional telephone line 33 and the ISP 42 of the party owning the second telephone 24. The functionality of the microcontroller 6 is identical to that described in connection with FIG. 1. However, its physical location has changed from inside the telephones 2,4 shown in FIG. 1 to outside the telephones 20,24 shown in FIG. 2 and inside separate electronic boxes 28,32. The telephones 20,24 have the alphabetic and numeric keypads or, alternatively, a conventional telephone numeric keypad with extra selection keys, as described for the telephones 2,4 shown in FIG. 1. Alternatively, the alphabetic keypad or extra selection keys may be placed on the separate electronic boxes 28, 32. Finally, the operation of the invention, upon the party owning the first telephone 20 dialing the alphabetic host address or IP address of the second telephone 24, would be the same as that described in FIG. 1 upon the party owning the first telephone 2 dialing the alphabetic host address or IP address of the second telephone 4.

The advantage of the embodiment shown in FIG. 2 over that shown in FIG. 1 is that the telephones 20,24 can be unplugged from their respective electronic boxes 28,32 and used as conventional telephones communicating over the conventional telephone network since they have at least a numeric keypad. The telephones 2,4 shown in FIG. 1, on the other hand, cannot ordinarily be used as conventional telephones since they are constantly connected to the Internet.

Figure 3:
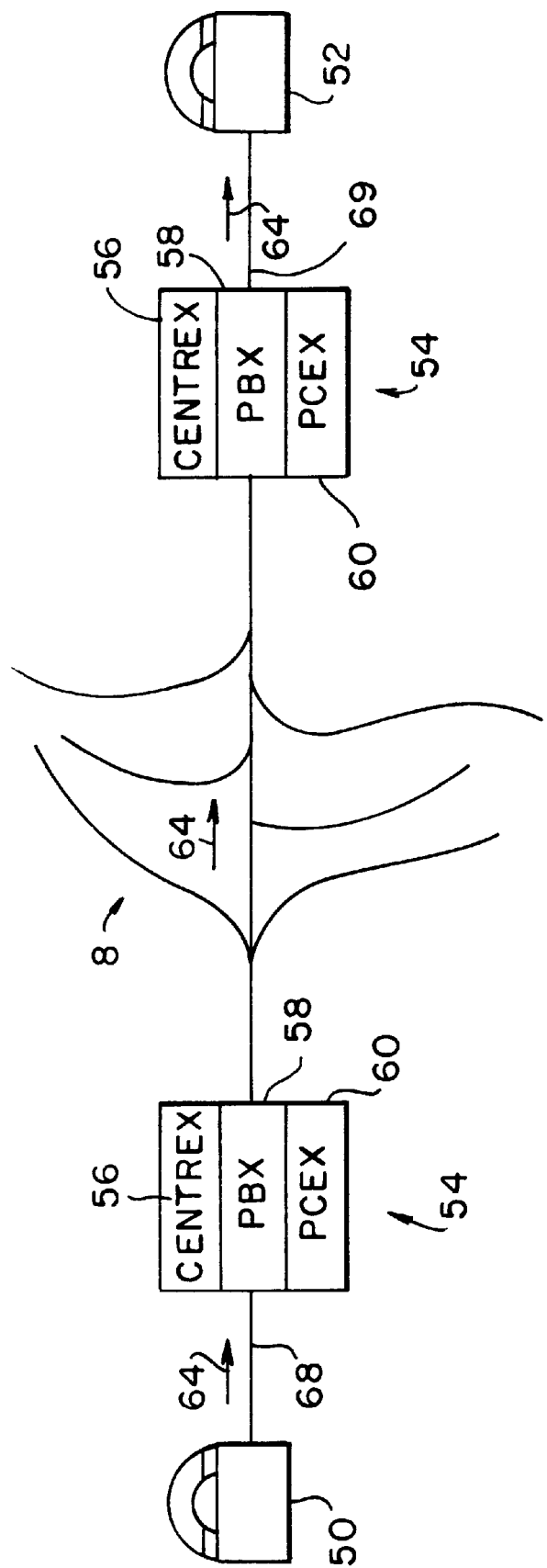
FIG. 3 is a schematic diagram of the third embodiment of the invention.

FIG. 3 shows a third embodiment of the invention. In this embodiment, a first conventional telephone 50 and a second conventional telephone 52 can make and receive telephone calls over the Internet 8. This is possible because the first telephone 50 and the second telephone 52 are connected to telephone switching equipment 54 that is connected to the Internet 8, instead of to the conventional telephone network. This telephone switching equipment can be in the form of a centrex 56, pbx 58, or pcex 60. This telephone switching equipment 54 will work in an analagous manner to that found in the conventional telephone network, but it will be connecting subscriber telephones connected to the Internet 8 to each other.

As an example of the operation of the invention in accordance with this embodiment, if the party owning the first telephone 50 wishes to call the party owning the second telephone 52, the party owning the first telephone 50 will simply dial the telephone number of the party owning the second telephone 52. Then the signal 64 produced by the first telephone 50, instead of traveling solely on the conventional telephone lines, will first travel over the conventional telephone lines 68 to telephone switching equipment 54, which may be any one of centrex switching equipment 56, pbx switching equipment 58, or pcex switching equipment 60, connected on one side to the first telephone 50 through the conventional telephone lines 68 and on the other side to the Internet 8. This switching equipment 54 will relay the signal 64 through the Internet 8 such that it is received by a second arrangement of switching equipment 54, which may again be any one of centrex switching equipment 56, pbx switching equipment 58, or pcex switching equipment 60, which is connected on one side to the Internet 8 and on the other side through conventional telephone lines 69 to the second telephone 52. The second arrangement of switching equipment 54 relays the signal 64 through conventional telephone lines 69 to the second telephone 52. When the second telephone 52 receives the signal 64 it rings and the party owning the second telephone 52 can pick up the receiver and a conversation can begin.

This third embodiment of the invention allows the use of completely conventional telephones and switching equipment to speak over the Internet, but requires that the switching equipment be connected to the Internet.

Figure 4:
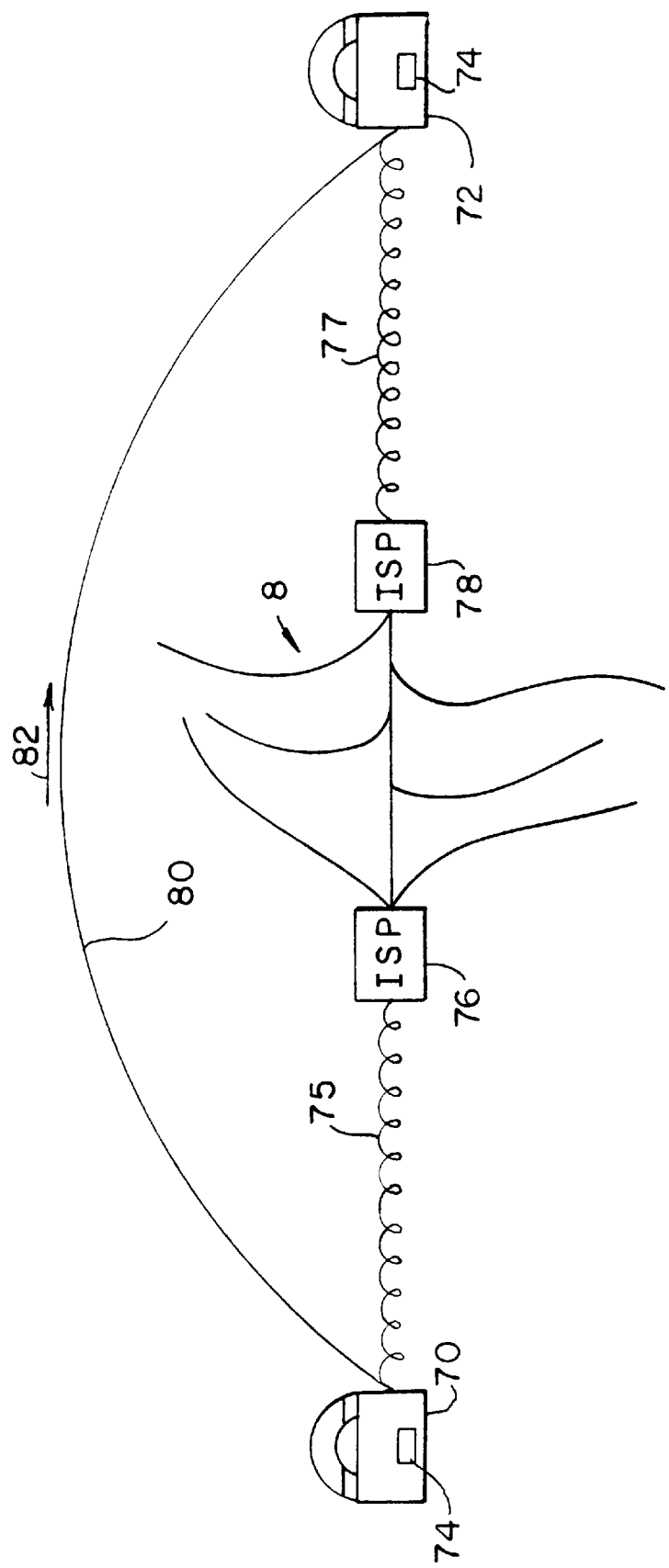
FIG. 4 is a schematic diagram of the fourth embodiment of the invention.

FIG. 4 shows the fourth embodiment of the invention. Analagously to the first embodiment shown in FIG. 1, there are a first telephone 70 and a second telephone 72 connected to the Internet 8 and capable of making and receiving calls over the Internet 8. Each telephone 70,72 is custom designed and contains a microcontroller 74. Each telephone has both a numeric keypad and an alphabetic keypad or, alternatively, a conventional telephone numeric keypad with extra selection keys as previously described in connection with the telephones 2,4 shown in FIG. 1. Analogously to FIG. 1, the first telephone 70 is connected to the Internet 8 through a first conventional telephone line 75 and the ISP 76 of the owner of the first telephone 70 and the second telephone 72 is connected to the Internet 8 through a second conventional telephone line 77 and the ISP 78 of the owner of the second telephone 72. However, unlike the embodiment of FIG. 1, the telephones 70,72 need not always be connected to the Internet 8, but may also be used for calls over the conventional telephone lines without the use of ISDN lines because of the method by which Internet telephone calls are connected. To demonstrate this method of operation, we consider a concrete example.

If the owner of the first telephone 70 desires to make a call over the Internet 8 to the owner of the second telephone 72, the owner of the first telephone 70 would dial the alphabetic host address or the IP address of the first telephone 70 and the alphabetic host address or the IP address of the second telephone 72 followed immediately by the regular telephone number of the second telephone 72. Of course, the order of dialing the various alphabetic host or IP addresses and the telephone number is only given by way of example and may be varied depending on the programming of the microcontroller 74.

The microcontroller 74 in the first telephone 70 would be programmed to respond to the dialing of the combined alphabetic host or IP addresses and the telephone number by transmitting, over the conventional telephone lines 80 connecting the two telephones 70,72, the alphabetic host address or the IP address 82 of the first telephone 70 to the second telephone 72. The first telephone 70 would then terminate the connection with the second telephone 72. The second telephone 72 would then dial the alphabetic host or IP address of the first telephone 70, causing a connection to the first telephone 70 through the ISP 78 of the owner of the second telephone 72 and the ISP 76 of the owner of the first telephone 70. While the second telephone 72 is dialing the alphabetic host or IP address of the first telephone 70, the first telephone 70 is dialing the alphabetic host or IP address of the second telephone 72, causing a connection to the second telephone 72 through the ISP 76 of the owner of the first telephone 70 and the ISP 78 of the owner of the second telephone 72. (It should be understood that "handshaking" or the process through which both telephones 70, 72 connect to each other can occur through numerous methods well known to those skilled in the art. For example, after the initial transmission of the alphabetic host address or IP address 82 of the first telephone 70 to the second telephone 72 over the conventional telephone lines 80, it may only be necessary for either one of the first telephone 70 or the second telephone 72 to dial the alphabetic host address or IP address of the other telephone for the telephones 70,72 to be connected to each other over the Internet.) Thus, both telephones 70,72 have been connected to the Internet 8 through the special dialing sequence on the first telephone 70 and by the special subsequent calling sequence previously described and they are only connected to the Internet 8 for conducting a telephone conversation by the special dialing sequence on one of the telephones 70,72 specified above. If a regular telephone number is dialed, the telephones 70,72 would react as a conventional telephone, placing the call over the conventional telephone lines 80.

This embodiment thus allows the telephones 70,72 to make and receive calls over the Internet 8 when desired or, if the Internet 8 is too busy or for some other reason is unsuitable for communication, over the conventional telephone lines 80.

Figure 5:
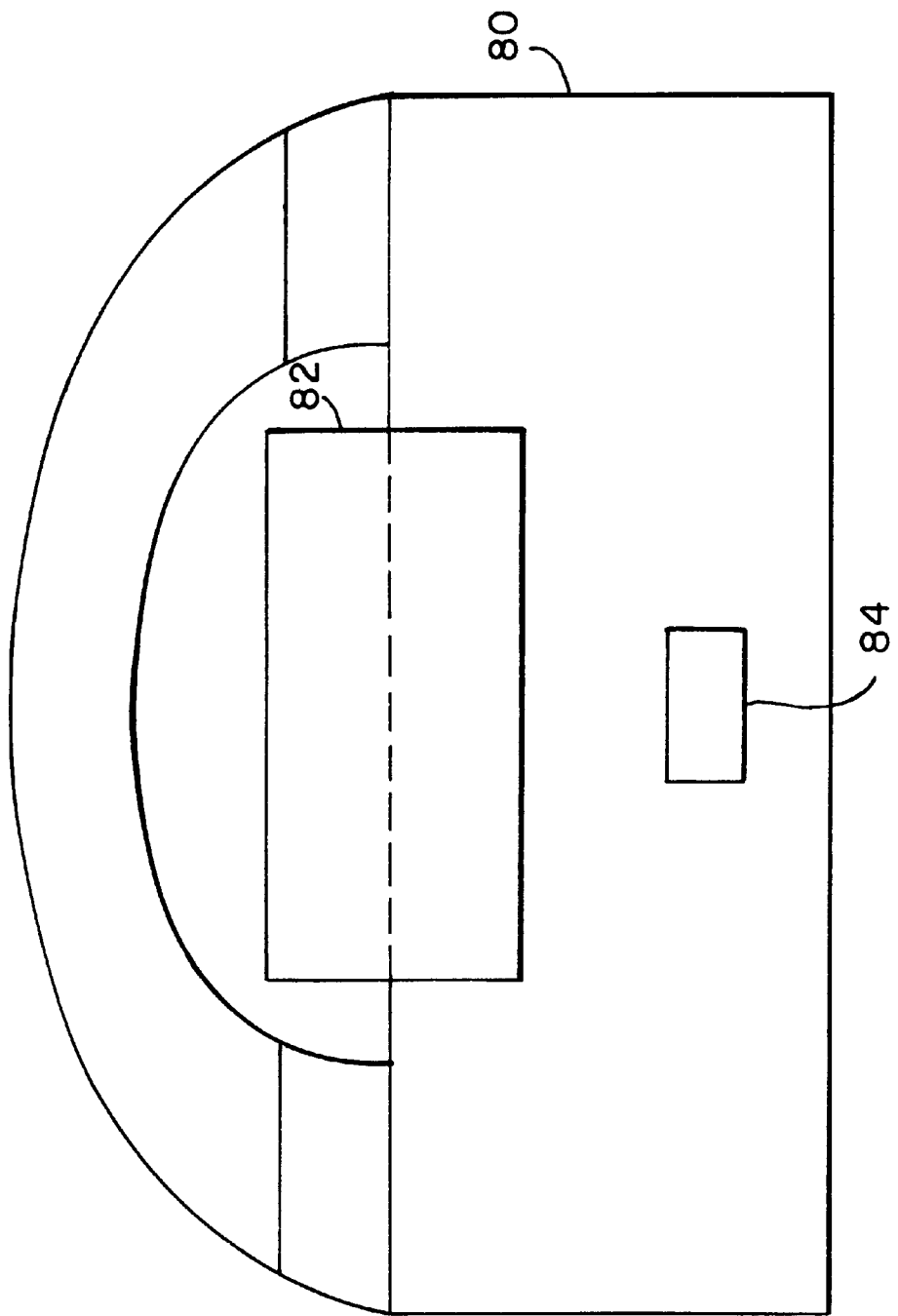
FIG. 5 is a schematic diagram of a telephonic device used in the fifth embodiment of the invention.

The fifth embodiment of the invention differs from the fourth embodiment of the invention in the telephones used. These telephones 80, one of which is shown in FIG. 5, differ from the telephones 70,72 shown in FIG. 4 insofar as they incorporate a device or devices 82 capable of sending or receiving or sending and receiving data over the Internet other than audio data and insofar as they have added functionality over that described for the telephones 70,72 and thus require a microprocesser 84 programmed to perform such additional functions. These telephones 80 will function, as did the telephones 70,72 in the fourth embodiment of the invention, to establish a telephone conversation between the owners of the telephones.

However, once such a conversation is established one or the other of the conversants may wish to use the device or devices 82 on the telephone to send data other than voice to the other conversant. Of course, in such an instance the device or devices 82 on the two telephones involved must be compatible to send or receive, as required, the data desired. This device or devices 82 may include, but are not limited to, facsimile transmission devices, including devices which can process color facsimiles or even three-dimensional facsimiles which are created by laser mathematically measuring solid objects, devices which can send or receive live or recorded video with or without an accompanying sound track, devices which can send or receive still pictures, and screens of all types for displaying text or graphical data. Since, as explained earlier, any such device or devices 82 must each have a separate IP address, the IP address of the device 82 called to receive data will be entered prior to such transmission taking place.

For example, assume the owner of a first telephone 80 which has a device 82 comprising a color facsimile transmitting device wishes to send a color facsimile to a second telephone 80' having a device 82' comprising a color facsimile receiving device. The owner of the first telephone 80 would enter the IP address or, equivalently, the alphabetic host address of the device 82' on the first telephone's keypad and this would cause the microcontroller 84 to establish a connection over the Internet to the device 82'. The color facsimile could then be sent from device 82 to device 82' while the owners of the two telephones 80,80' are conversing, provided that the telephone lines to the respective ISP's of the owners of the two telephones 80,80' will accomodate such simultaneous data transfer.

It should, of course, be understood that the telephones included in the fifth embodiment of the invention could be used to transmit data other than audio communication even in the absence of a telephone conversation. This would be done by following a process completely analagous to that described in the fourth embodiment of the invention for initiating a telephone call except that IP addresses or alphabetic host addresses of the sending or receiving or sending and receiving devices would be used, instead of IP addresses or alphabetic host addresses of the telephones into which those sending or receiving or sending and receiving devices are incorporated.

It should be understood that all references to the Internet herein are meant to be exemplary only since this invention will allow telephonic communications over other computer networks than the Internet such as, for example only, Bitnet, local area networks (LANs), and wide area networks (WANs) by analogous methods well known to those with ordinary skill in the art. It should also be understood that music or other sounds as well as the human voice may be transmitted over the telephonic devices contemplated herein, just as conventional telephones can transmit a variety of sounds. It should also be understood that when we have referred to conventional telephone lines connecting the telephones in any one of the embodiments above to either an ISP or telephone switching equipment, such conventional telephone lines can include high capacity lines, such as, for example, a T1 line, a line primarily carrying cable television, or an ISDN line, which will allow many telephones to be connected to the ISP or switching equipment over one high capacity line. This can be done so long as a network server, which is a dedicated computer, or other equivalent device acts as an interface between the high capacity line and the individual telephones. Finally, all references to a microcontroller should be understood as being exemplary only since any programmable electronic device will serve the purpose contemplated by this invention just as effectively.

While preferred embodiments have been described herein, it will be understood by those with ordinary skill in the art that various modifications, changes, or alterations may be made to the invention disclosed and described herein without departing from its scope or its equivalent as claimed in the appended claims. For instance, it may easily be imagined that one of the telephonic devices described herein may be connected to more than one computer network simultaneously upon suitable programming of its microcontroller or that the telephone switching equipment described in connection with FIG. 3 may be connected to and allow communication on more than one computer network simultaneously. Other modifications too numerous to mention will easily occur to one of ordinary skill in the art.

What is claimed is:

1. A first telephonic device connected to at least one computer network, said first telephonic device comprising:

(A) a means for entry of at least one first symbol; and
   (B) an electronic device, said electronic device being programmed such that upon entry of said at least one first symbol, said electronic device causes a connection to be established over one of said at least one computer network with a second telephonic device connected to said one computer network, said connection being suitable for communication, comprising at least audio communication, between said first telephonic device and said second telephonic device, said at least one first symbol comprising:
   at least one symbol selected from the first group of symbols consisting of:
   (1) at least one of a first alphanumeric symbol being entered by a user of said first telephonic device and corresponding to at least one first electronic address selected from the first group of electronic addresses consisting of:
      (a) an electronic address of a first kind of said second telephonic device;
      (b) a combination of an electronic address of said first kind of said first telephonic device and an electronic address of said first kind of said second telephonic device; and
      (c) a combination of an electronic address of said first kind of said first telephonic device and an electronic address of a second kind of said second telephonic device; and
   (2) at least one of a second alphanumeric symbol being entered by said user of said first telephonic device and directly specifying said at least one first electronic address; and said at least one first symbol further comprising:
   (3) a telephone number of said second telephonic device being entered by said user of said first telephonic device if said at least one first electronic address is selected from the second group of electronic addresses consisting of:
      (a) said combination of said electronic address of said first kind of said first telephonic device and said electronic address of said first kind of said second telephonic device; and
      (b) said combination of said electronic address of said first kind of said first telephonic device and said electronic address of said second kind of said second telephonic device;
   (4) said at least one of said first alphanumeric symbol being converted within said first telephonic device to said at least one first electronic address;
   (5) said electronic device being capable of causing said connection to be established upon entry of at least one second symbol comprising:
      (a) at least one symbol from the second group of symbols consisting of:
         (i) at least one of a third alphanumeric symbol being entered by said user of said first telephonic device and corresponding to at least one second electronic address selected from a third group of electronic addresses, the third group of electronic addresses being selected from the fourth group of electronic addresses consisting of:
            (aa) said combination of said electronic address of said first kind of said first telephonic device and said electronic address of said first kind of said second telephonic device;
            (bb) said combination of said electronic address of said first kind of said first telephonic device and said electronic address of said second kind of said second telephonic device;
            (cc) said electronic address of said first kind of said second telephonic device, and said combination of said electronic address of said first kind of said first telephonic device and said electronic address of said first kind of said second telephonic device;
            (dd) said electronic address of said first kind of said second telephonic device, and said combination of said electronic address of said first kind of said first telephonic device and said electronic address of said second kind of said second telephonic device;
            (ee) said combination of said electronic address of said first kind of said first telephonic device and said electronic address of said first kind of said second telephonic device, and said combination of said electronic address of said first kind of said first telephonic device and said electronic address of said second kind of said second telephonic device; and
            (ff) said electronic address of said first kind of said second telephonic device, said combination of said electronic address of said first kind of said first telephonic device and said electronic address of said first kind of said second telephonic device, and said combination of said electronic address of said first kind of said first telephonic device and said electronic address of said second kind of said second telephonic device; and (ii) at least one of a fourth alphanumeric symbol being entered by said user of said first telephonic device and directly specifying said at least one second electronic address; and said at least one second symbol further comprising:
(6) said telephone number of said second telephonic device being entered by said user of said first telephonic device if said at least one second electronic address is selected from the fifth group of electronic addresses consisting of:
(a) said combination of said electronic address of said first kind of said first telephonic device and said electronic address of said first kind of said second telephonic device; and
(b) said combination of said electronic address of said first kind of said first telephonic device and said electronic address of said second kind of said second telephonic device.

2. A first telephonic device as claimed in claim 1, wherein said means for entry of at least one symbol comprises:
a. a numeric keypad; and
b. an alphabetic keypad.

3. A first telephonic device as claimed in claim 1, wherein said means for entry of at least one symbol comprises:
a. an alphanumeric keypad with at least one letter being located on at least one key in said keypad where a number is located; and
b. at least one selection key to select at least one letter on at least one key in said keypad.

4. A first telephonic device as claimed in claim 1, wherein said electronic device comprises a microcontroller.

5. A first telephonic device as claimed in claim 1, wherein said electronic device is contained within a module detachably attached to a remainder of said telephonic device.

6. A first telephonic device as claimed in claim 5, wherein said connection of said telephonic device to the Internet is accomplished through an internet service provider.

7. A first telephonic device as claimed in claim 1, wherein said at least one computer network comprises the Internet.

8. A method of establishing said connection over the Internet between said first telephonic device and said second telephonic device as claimed in claim 7, which comprises the steps of:
said user of said first telephonic device entering said at least one symbol on said means for entry of at least one symbol, said at least one symbol comprising an alphabetic host address of said second telephonic device; and
said first telephonic device connecting to said second telephonic device over the Internet using said alphabetic host address of said second telephonic device.

9. A method of establishing said connection over the Internet between said first telephonic device and said second telephonic device as claimed in claim 7, which comprises the steps of:
said user of said first telephonic device entering said at least one symbol on said means for entry of at least one symbol, said at least one symbol comprising an Internet Protocol address of said second telephonic device; and
said first telephonic device connecting to said second telephonic device over the Internet using said Internet Protocol address of said second telephonic device.

10. A method of establishing said connection over the Internet between said first telephonic device and said second telephonic device as claimed in claim 7, which comprises the steps of:
said user of said first telephonic device entering said at least one symbol on said means for entry of at least one symbol, said at least one symbol comprising:
an Internet Protocol address of said first telephonic device;
an Internet Protocol address of said second telephonic device; and
a telephone number of said second telephonic device;
said first telephonic device connecting over conventional telephone lines to said second telephonic device using said telephone number of said second telephonic device;
said first telephonic device transmitting said Internet Protocol address of said first telephonic device to said second telephonic device over said conventional telephone lines;
said first telephonic device terminating said connection over said conventional telephone lines to said second telephonic device;
said first telephonic device connecting to said second telephonic device over the Internet using said Internet Protocol address of said second telephonic device; and
said second telephonic device connecting to said first telephonic device over the Internet using said Internet Protocol address of said first telephonic device.

11. A method of establishing said connection over the Internet between said first telephonic device and said second telephonic device as claimed in claim 7, which comprises the steps of:
said user of said first telephonic device entering said at least one symbol on said means for entry of at least one symbol, said at least one symbol comprising:
an Internet Protocol address of said first telephonic device;
an alphabetic host address of said second telephonic device; and
a telephone number of said second telephonic device;
said first telephonic device connecting over conventional telephone lines to said second telephonic device using said telephone number of said second telephonic device;
said first telephonic device transmitting said Internet Protocol address of said first telephonic device to said second telephonic device over said conventional telephone lines;
said first telephonic device terminating said connection over said conventional telephone lines to said second telephonic device;
said first telephonic device connecting to said second telephonic device over the Internet using said alphabetic host address of said second telephonic device; and
said second telephonic device connecting to said first telephonic device over the Internet using said Internet Protocol address of said first telephonic device.

12. A method of establishing said connection over the Internet between said first telephonic device and said second telephonic device as claimed in claim 7, which comprises the steps of:
said user of said first telephonic device entering said at least one symbol on said means for entry of at least one symbol, said at least one symbol comprising:
an alphabetic host address of said first telephonic device;
an Internet Protocol address of said second telephonic device; and
a telephone number of said second telephonic device;
said first telephonic device connecting over conventional telephone lines to said second telephonic device using said telephone number of said second telephonic device;

said first telephonic device transmitting said alphabetic host address of said first telephonic device to said second telephonic device over said conventional telephone lines;

said first telephonic device terminating said connection over said conventional telephone lines to said second telephonic device;

said first telephonic device connecting to said second telephonic device over the Internet using said Internet Protocol address of said second telephonic device; and said second telephonic device connecting to said first telephonic device over the Internet using said alphabetic host address of said first telephonic device.

13. A method of establishing said connection over the Internet between said first telephonic device and said second telephonic device as claimed in claim 7, which comprises the steps of:

said user of said first telephonic device entering said at least one symbol on said means for entry of at least one symbol, said at least one symbol comprising:
an alphabetic host address of said first telephonic device;
an alphabetic host address of said second telephonic device; and
a telephone number of said second telephonic device;

said first telephonic device connecting over conventional telephone lines to said second telephonic device using said telephone number of said second telephonic device;

said first telephonic device transmitting said alphabetic host address of said first telephonic device to said second telephonic device over said conventional telephone lines;

said first telephonic device terminating said connection over said conventional telephone lines to said second telephonic device;

said first telephonic device connecting to said second telephonic device over the Internet using said alphabetic host address of said second telephonic device; and said second telephonic device connecting to said first telephonic device over the Internet using said alphabetic host address of said first telephonic device.

14. A first telephonic device as claimed in claim 1, wherein said connection of said telephonic device to said at least one computer network must be continuous, despite the absence of any communication being conducted over said telephonic device.

15. A first telephonic device as claimed in claim 1, wherein said audio communication comprises voice communication.

16. A first telephonic device as claimed in claim 1, wherein said audio communication comprises full duplex communication.

17. A first telephonic device as claimed in claim 1 which further comprises means for sending, receiving, or sending and receiving communication other than audio communication over said at least one computer network.

18. A first telephonic device as claimed in claim 17, wherein said means for sending, receiving, or sending and receiving communication comprises means for facsimile transmission, reception, or transmission and reception.

19. A first telephonic device as claimed in claim 17, wherein said means for sending, receiving, or sending and receiving communication comprises means for sending, receiving, or sending and receiving visual data.

20. A first telephonic device as claimed in claim 17, wherein said means for sending, receiving, or sending and receiving communication comprises means for sending, receiving, or sending and receiving textual data.

21. A telephonic system connected to at least one computer network, said telephonic system comprising at least two of said first telephonic device as claimed in claim 17, said telephonic system being connected to said at least one computer network such that at least audio communication may be conducted between said at least two telephonic devices.

22. A telephonic system as claimed in claim 21, wherein said at least one computer network comprises the Internet.

23. A method of establishing said communication between a first and a second telephonic device of said at least two telephonic devices over the Internet as claimed in claim 22, comprising the steps of:

said user of said first telephonic device entering said at least one symbol on said means for entry of at least one symbol comprised within said first telephonic device, said at least one symbol comprising an Internet Protocol address of said means for sending, receiving, or sending and receiving communication other than audio communication comprised within said second telephonic device; and said first telephonic device connecting to said second telephonic device over the Internet using said Internet Protocol address of said means for sending, receiving, or sending and receiving communication other than audio communication comprised within said second telephonic device.

24. A method of establishing said communication between a first and a second telephonic device of said at least two telephonic devices over the Internet as claimed in claim 22, comprising the steps of:

said user of said first telephonic device entering said at least one symbol on said means for entry of at least one symbol comprised within said first telephonic device, said at least one symbol comprising an alphabetic host address of said means for sending, receiving, or sending and receiving communication other than audio communication comprised within said second telephonic device; and said first telephonic device connecting to said second telephonic device over the Internet using said alphabetic host address of said means for sending, receiving, or sending and receiving communication other than audio communication comprised within said second telephonic device.

25. A method of establishing said communication between a first and a second telephonic device of said at least two telephonic devices over the Internet as claimed in claim 22, comprising the steps of:

said user of said first telephonic device entering said at least one symbol on said means for entry of at least one symbol comprised within said first telephonic device, said at least one symbol comprising:
an Internet Protocol address of said means for sending, receiving, or sending and receiving communication other than audio communication comprised within said first telephonic device;
an Internet Protocol address of said means for sending, receiving, or sending and receiving communication other than audio communication comprised within said second telephonic device; and
a telephone number of said second telephonic device;

said first telephonic device connecting over conventional telephone lines to said second telephonic device using said telephone number of said second telephonic device;

said first telephonic device transmitting said Internet Protocol address of said means for sending, receiving, or sending and receiving communication other than audio communication comprised within said first telephonic device to said second telephonic device over said conventional telephone lines;

said first telephonic device terminating said connection over said conventional telephone lines to said second telephonic device;

said first telephonic device connecting to said second telephonic device over the Internet using said Internet Protocol address of said means for sending, receiving, or sending and receiving communication other than audio communication comprised within said second telephonic device; and said second telephonic device connecting to said first telephonic device over the Internet using said Internet Protocol address of said means for sending, receiving, or sending and receiving communication other than audio communication comprised within said first telephonic device.

26. A method of establishing said communication between a first and a second telephonic device of said at least two telephonic devices over the Internet as claimed in claim 22, comprising the steps of:

said user of said first telephonic device entering said at least one symbol on said means for entry of at least one symbol comprised within said first telephonic device, said at least one symbol comprising:

an Internet Protocol address of said means for sending, receiving, or sending and receiving communication other than audio communication comprised within said first telephonic device;

an alphabetic host address of said means for sending, receiving, or sending and receiving communication other than audio communication comprised within said second telephonic device; and a telephone number of said second telephonic device;

said first telephonic device connecting over conventional telephone lines to said second telephonic device using said telephone number of said second telephonic device;

said first telephonic device transmitting said Internet Protocol address of said means for sending, receiving, or sending and receiving communication other than audio communication comprised within said first telephonic device to said second telephonic device over said conventional telephone lines;

said first telephonic device terminating said connection over said conventional telephone lines to said second telephonic device;

said first telephonic device connecting to said second telephonic device over the Internet using said alphabetic host address of said means for sending, receiving, or sending and receiving communication other than audio communication comprised within said second telephonic device; and said second telephonic device connecting to said first telephonic device over the Internet using said Internet Protocol address of said means for sending, receiving, or sending and receiving communication other than audio communication comprised within said first telephonic device.

27. A method of establishing said communication between a first and a second telephonic device of said at least two telephonic devices over the Internet as claimed in claim 22, comprising the steps of:

said user of said first telephonic device entering said at least one symbol on said means for entry of at least one symbol comprised within said first telephonic device, said at least one symbol comprising:

an alphabetic host address of said means for sending, receiving, or sending and receiving communication other than audio communication comprised within said first telephonic device;

an Internet Protocol address of said means for sending, receiving, or sending and receiving communication other than audio communication comprised within said second telephonic device; and a telephone number of said second telephonic device;

said first telephonic device connecting over conventional telephone lines to said second telephonic device using said telephone number of said second telephonic device;

said first telephonic device transmitting said alphabetic host address of said means for sending, receiving, or sending and receiving communication other than audio communication comprised within said first telephonic device to said second telephonic device over said conventional telephone lines;

said first telephonic device terminating said connection over said conventional telephone lines to said second telephonic device;

said first telephonic device connecting to said second telephonic device over the Internet using said Internet Protocol address of said means for sending, receiving, or sending and receiving communication other than audio communication comprised within said second telephonic device; and said second telephonic device connecting to said first telephonic device over the Internet using said alphabetic host address of said means for sending, receiving, or sending and receiving communication other than audio communication comprised within said first telephonic device.

28. A method of establishing said communication between a first and a second telephonic device of said at least two telephonic devices over the Internet as claimed in claim 22, comprising the steps of:

said user of said first telephonic device entering said at least one symbol on said means for entry of at least one symbol comprised within said first telephonic device, said at least one symbol comprising:

an alphabetic host address of said means for sending, receiving, or sending and receiving communication other than audio communication comprised within said first telephonic device;

an alphabetic host address of said means for sending, receiving, or sending and receiving communication other than audio communication comprised within said second telephonic device; and a telephone number of said second telephonic device;

said first telephonic device connecting over conventional telephone lines to said second telephonic device using said telephone number of said second telephonic device;

said first telephonic device transmitting said alphabetic host address of said means for sending, receiving, or sending and receiving communication other than audio communication comprised within said first telephonic device to said second telephonic device over said conventional telephone lines;

said first telephonic device terminating said connection over said conventional telephone lines to said second telephonic device;

said first telephonic device connecting to said second telephonic device over the Internet using said alphabetic host address of said means for sending, receiving, or sending and receiving communication other than audio communication comprised within said second telephonic device; and said second telephonic device connecting to said first telephonic device over the Internet using said alphabetic host address of said means for sending, receiving, or sending and receiving communication other than audio communication comprised within said first telephonic device.

29. A telephonic device as claimed in claim 1, wherein said electronic address of said first kind comprises an alphabetic host address and said electronic address of said second kind comprises an Internet Protocol address.

30. A telephonic device as claimed in claim 1, wherein said electronic address of said first kind comprises an Internet Protocol address and said electronic address of said second kind comprises an alphabetic host address.

31. A telephonic system connected to at least one computer network, said telephonic system comprising:

(A) at least two telephonic devices connected to said at least one computer network such that communication, comprising at least audio communication, may be conducted between said at least two telephonic devices, said communication between a first of said at least two telephonic devices and a second of said at least two telephonic devices being initiated by entry of at least one first symbol on said first of said at least two telephonic devices, said at least one first symbol comprising:

at least one symbol selected from the first group of symbols consisting of:

(1) at least one of a first alphanumeric symbol being entered by a user of said first of said at least two telephonic devices and corresponding to at least one first electronic address selected from the first group of electronic addresses consisting of:

(a) an electronic address of a first kind of said second of said at least two telephonic device;

(b) a combination of an electronic address of said first kind of said first of said at least two telephonic devices and an electronic address of said first kind of said second of said at least two telephonic devices; and (c) a combination of an electronic address of said first kind of said first of said at least two telephonic devices and an electronic address of a second kind of said second of said at least two telephonic devices; and (2) at least one of a second alphanumeric symbol being entered by said user of said first of said at least two telephonic devices and directly specifying said at least one first electronic address; and said at least one first symbol further comprising:

(3) a telephone number of said second of said at least two telephonic devices being entered by said user of said first of said at least two telephonic devices if said at least one first electronic address is selected from the second group of electronic addresses consisting of:

(a) said combination of said electronic address of said first kind of said first of said at least two telephonic devices and said electronic address of said first kind of said second of said at least two telephonic devices; and (b) said combination of said electronic address of said first kind of said first of said at least two telephonic devices and said electronic address of said second kind of said second of said at least two telephonic devices;

(4) said at least one of said first alphanumeric symbol being converted within said first of said at least two telephonic devices to said at least one first electronic address;

(5) said first of said at least two telephonic devices being capable of causing said communication to be initiated upon entry of at least one second symbol comprising:

(a) at least one symbol from the second group of symbols consisting of:

(i) at least one of a third alphanumeric symbol being entered by said user of said first of said at least two telephonic devices and corresponding to at least one second electronic address selected from a third group of electronic addresses, the third group of electronic addresses being selected from the fourth group of electronic addresses consisting of:

(aa) said combination of said electronic address of said first kind of said first of said at least two telephonic devices and said electronic address of said first kind of said second of said at least two telephonic devices;

(bb) said combination of said electronic address of said first kind of said first of said at least two telephonic devices and said electronic address of said second kind of said second of said at least two telephonic devices;

(cc) said electronic address of said first kind of said second of said at least two telephonic devices, and said combination of said electronic address of said first kind of said first of said at least two telephonic devices and said electronic address of said first kind of said second of said at least two telephonic devices;

(dd) said electronic address of said first kind of said second of said at least two telephonic devices, and said combination of said electronic address of said first kind of said first of said at least two telephonic devices and said electronic address of said second kind of said second of said at least two telephonic devices;

(ee) said combination of said electronic address of said first kind of said first of said at least two telephonic devices and said electronic address of said first kind of said second of said at least two telephonic devices, and said combination of said electronic address of said first kind of said first of said at least two telephonic devices and said electronic address of said second kind of said second of said at least two telephonic devices; and (ff) said electronic address of said first kind of said second of said at least two telephonic devices, said combination of said electronic address of said first kind of said first of said at least two telephonic devices and said electronic address of said first kind of said second of said at least two telephonic devices, and said combination of said electronic address of said first kind of said first of said at least two telephonic devices and said electronic address of said second kind of said second of said at least two telephonic devices; and (ii) at least one of a fourth alphanumeric symbol being entered by said user of said first of said at least two telephonic devices and directly specifying said at least one second electronic address; and said at least one second symbol further comprising:

(6) said telephone number of said second of said at least two second telephonic devices being entered by said user of said first of said at least two telephonic devices if said at least one second electronic addresses is selected from the fifth group of electronic addresses consisting of:

(a) said combination of said electronic address of said first kind of said first of said at least two telephonic devices and said electronic address of said first kind of said second of said at least two telephonic devices; and (b) said combination of said electronic address of said first kind of said first of said at least two telephonic devices and said electronic address of said second kind of said second of said at least two telephonic devices.

32. A telephonic system as claimed in claim 31, wherein each telephonic device of said at least two telephonic devices comprises:

a means for entry of said at least one alphanumeric symbol; and an electronic device, said electronic device being programmed such that upon entry of said at least one alphanumeric symbol, said electronic device causes a connection to be established over one of said at least one computer network with another telephonic device connected to said one computer network, said connection being suitable for communication, comprising at least audio communication, between said telephonic device and said other telephonic device.

33. A telephonic system as claimed in claim 32, wherein said means for entry of said at least one alphanumeric symbol comprises:

a. a numeric keypad; and
b. an alphabetic keypad.

34. A telephonic system as claimed in claim 32, wherein said means for entry of said at least one alphanumeric symbol comprises:

a. an alphanumeric keypad with at least one letter being located on at least one key in said keypad where a number is located; and b. at least one selection key to select at least one letter on at least one key in said keypad.

35. A telephonic system as claimed in claim 32, wherein said electronic device comprises a microcontroller.

36. A telephonic system as claimed in claim 32, wherein each of said at least two telephonic devices further comprises a module detachably attached to a remainder of said telephonic device, said electronic device being contained within said module.

37. A telephonic system as claimed in claim 36, wherein said means for entry of said at least one alphanumeric symbol comprises:

a. a numeric keypad; and
b. an alphabetic keypad.

38. A telephonic system as claimed in claim 37, wherein said alphabetic keypad is placed on said module.

39. A telephonic system as claimed in claim 36, wherein said means for entry of said at least one alphanumeric symbol comprises:

a. an alphanumeric keypad with at least one letter being located on at least one key in said keypad where a number is located; and b. at least one selection key to select at least one letter on at least one key in said keypad.

40. A telephonic system as claimed in claim 39, wherein said at least one selection key is placed on said module.

41. A telephonic system as claimed in claim 31, wherein said at least one computer network comprises the Internet.

42. A telephonic system as claimed in claim 41, wherein said connection of said at least two telephonic devices to the Internet is accomplished through at least one internet service provider.

43. A telephonic system as claimed in claim 31, wherein said connection of said at least two telephonic devices to said at least one computer network must be continuous, despite the absence of any communication being conducted over said at least two telephonic devices.

44. A telephonic system as claimed in claim 31, wherein said audio communication comprises voice communication.

45. A telephonic system as claimed in claim 31, wherein said audio communication comprises full duplex communication.

46. A telephonic system as claimed in claim 31, wherein said electronic address of said first kind comprises an alphabetic host address and said electronic address of said second kind comprises an Internet Protocol address.

47. A telephonic system as claimed in claim 31, wherein said electronic address of said first kind comprises an Internet Protocol address and said electronic address of said second kind comprises an alphabetic host address.

* * * * *